United States Patent [19]

Segars

[11] 4,340,850
[45] Jul. 20, 1982

[54] TEMPERATURE RESPONSIVE CONTROL CIRCUIT

[75] Inventor: Ronald A. Segars, Hopkinton, Mass.

[73] Assignee: The United States of America as represented by the Secretary of the Army, Washington, D.C.

[21] Appl. No.: 184,867

[22] Filed: Sep. 8, 1980

[51] Int. Cl.³ ............................................. G05F 1/00
[52] U.S. Cl. .................................... 323/218; 323/354; 219/501; 307/252 B
[58] Field of Search .............. 219/486, 501, 504, 505; 307/117, 252 B, 252 N, 252 T; 323/217, 218, 282, 354

[56] References Cited

U.S. PATENT DOCUMENTS

| | | | |
|---|---|---|---|
| 2,540,600 | 2/1951 | Stalhane | 323/369 |
| 3,343,004 | 9/1967 | Ovshinsky | 323/352 X |
| 3,392,626 | 7/1968 | Miller et al. | 307/252 B |
| 3,511,972 | 5/1970 | Shaffer, Jr. | 219/501 |
| 3,548,157 | 12/1970 | Lauck | 219/501 |
| 3,588,446 | 6/1971 | Mills | 219/501 |
| 3,898,593 | 8/1975 | Qureshi | 323/354 X |

OTHER PUBLICATIONS

General Electric Silicon Control Rectifier Manual, pp. 252-253.

Primary Examiner—William M. Shoop
Attorney, Agent, or Firm—Nathan Edelberg; Robert P. Gibson; Lawrence E. Labadini

[57] ABSTRACT

The delivery of alternating current from a source to a load, especially a resistance heater, is accurately controlled as a function of temperature through the employment of a bidirectional solid state switch. A full-wave power control for the solid state switch includes a temperature probe comprising one or a combination of voltage and temperature sensitive devices.

4 Claims, 1 Drawing Figure

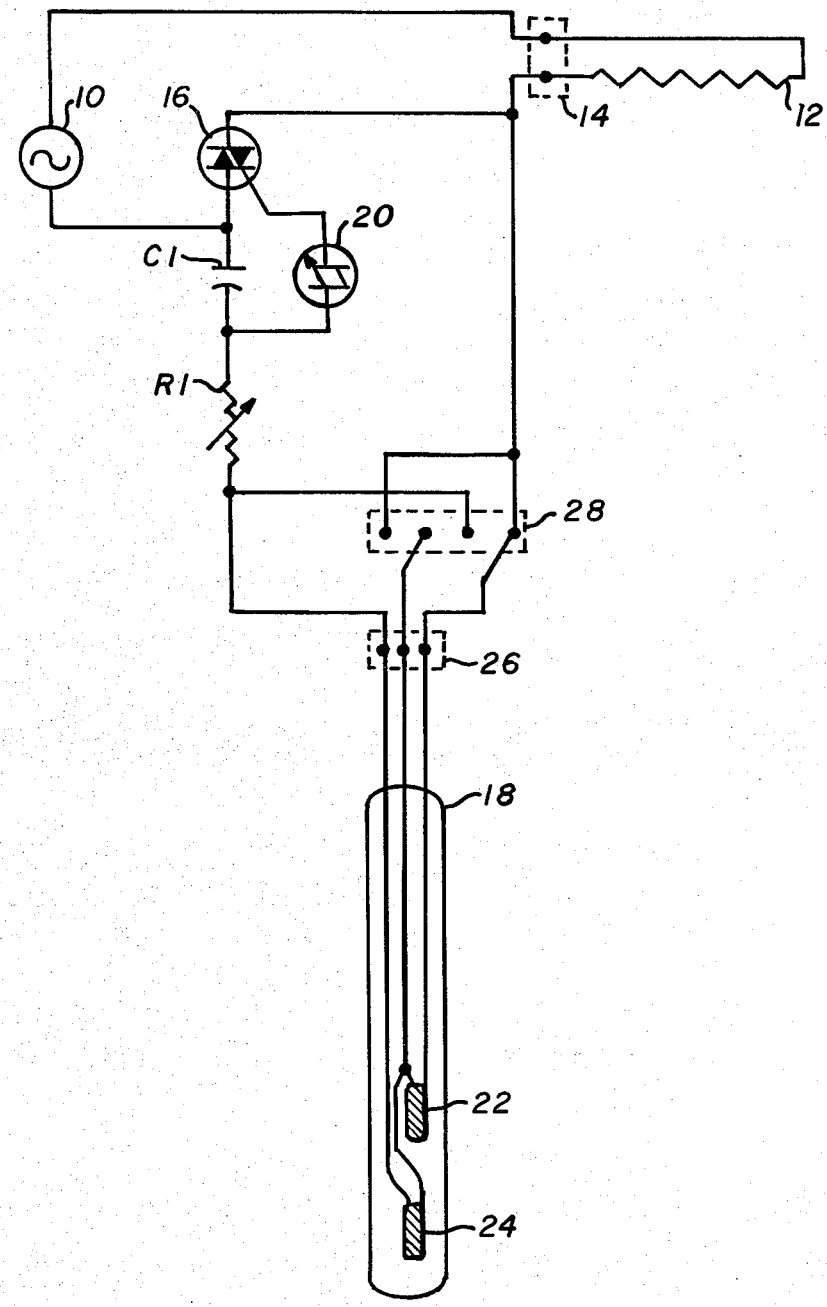

TEMPERATURE RESPONSIVE CONTROL CIRCUIT

The invention described herein may be manufactured, used, and licensed by or for the Government for governmental purposes without the payment to me of any royalty thereon.

BACKGROUND OF THE INVENTION

(1) Field of the Invention

The present invention relates to the exercise of control over the delivery of electrical current to a load in response to a monitored temperature and particularly to accurately maintaining the monitored temperature within a predetermined narrow range by controlling the delivery of current to a resistance heater. More specifically, this invention is directed to an improved temperature responsive control circuit and especially a controllable circuit for coupling a source of alternating current to an electric heater. Accordingly, the general objects of the present invention are to provide novel and simplified methods and apparatus of such character.

(2) Description of the Prior Art

Temperature responsive control circuits are, of course, well known in the art. The most common type of such prior art control circuit includes a switch which, in response to sensed temperature, is caused to assume either the "open" or "closed" state. A principal disadvantage of such prior art temperature controlled switching circuits resides in the fact that the exercise of accurate control over the temperature in the region being monitored is not possible. This inability to accurately control temperature is principally a function of the fact that the switch must be closed at a first lower temperature limit and opened at a second or upper temperature limit and the range between these limits is necessarily relatively large. This mode of operation results in a constantly fluctuating temperature which, while it cannot be eliminated, can be minimized in magnitude only through resort to complex and thus expensive control circuits.

SUMMARY OF THE INVENTION

The present invention overcomes the above briefly discussed and other deficiencies and disadvantages over the prior art by providing a simplified means for the precise exercise of control over the delivery of energizing current to a load, particularly an electric heater, in response to the sensing of the temperature in the vicinity of the load. Apparatus in accordance with a preferred embodiment of the present invention includes a bidirectional solid state switch connected in series with the load, which is typically a resistance heater, and a source of alternating current. The present invention further contemplates a unique trigger control circuit for adjusting that portion of each half of the cycle of the source voltage when load current is permitted to flow. The trigger control circuit includes a passive circuit element or elements which exhibit a change in impedance in response to the temperatures to which they are exposed. Specifically, the present invention employs, in a temperature probe, one or more devices which are sensitive to both temperature and the applied voltage. These temperature and voltage sensitive components, known in the art as posistors, may, in accordance with a preferred embodiment, selectively be connected in series or parallel. A probe containing the posistor or posistors is exposed to the temperature to be controlled and, as the resistance of the posistors vary, the duty cycle of the solid state switch will be varied thereby controlling the average current delivered to the load and thus the temperature of the load.

In accordance with the preferred embodiment the bidirectional solid state switch comprises a pair of oppositely polarized silicon controlled rectifiers connected in parallel; i.e., a triac; which define a gate controlled semiconductor device. Gate current for the triac is supplied, from the alternating current source, by a full-wave phase control circuit which comprises an asymmetrical silicon bilateral switch (ASBS); and an RC series circuit connected in parallel with the load. The resistance in the RC circuit includes the posistors and thus the phase difference between the source voltage and the voltage across the capacitance will vary with temperature. The magnitude of the voltage across the capacitance controls the "breakdown" of the ASBS and thus the on-set of conduction of the triac during each half cycle of the source voltage. The triac will cease to conduct, due to current starvation, as the source voltage approaches the zero-crossing point at the end of each half cycle. Thus, the triac functions as a rapidly operated switch.

BRIEF DESCRIPTION OF THE DRAWING

The present invention will be better understood and its numerous objects and advantages will become apparent to those skilled in the art by reference to the accompanying drawing which is an electrical schematic diagram of a preferred embodiment of the invention.

DESCRIPTION OF THE PREFERRED EMBODIMENT

With reference to the drawing, a load and switch device are connected in series across an alternating current source indicated generally at 10. In the disclosed embodiment, the load comprises a resistance heater 12 which may, if deemed necessary or desirable, be easily removable from the circuit through the use of a conventional two terminal plug 14. The series connected switch, in the preferred embodiment, comprises a triac 16. As is well known, a triac comprises a pair of oppositely polarized silicon controlled rectifiers which define a gate controlled bi-directional solid state switch. In one reduction to practice of the invention the triac comprised a General Electric Company type SC141D.

The present invention comprises a temperature responsive trigger control for triac 16. This control includes a series RC circuit connected in parallel with the triac 16. The RC circuit comprises capacitor C1, a variable resistance R1 and temperature sensitive resistance elements positioned in a probe 18.

The trigger control circuit for triac 16 further includes an asymmetrical silicon bilateral switch (ASBS) 20 connected between the gate input to the triac and the junction between capacitor C1 and variable resistance R1. The ASBS 20 was a General Electric Company type ST4 in one reduction to practice of the invention. The device 20 is characterized by a breakover voltage of approximately 8 volts in one direction and approximately 16 volts in the other direction. The ASBS 20 is responsive to the charge on capacitor C1. The charge on capacitor C1 leads the voltage from source 10 by a phase angle which is determined by the resistance in series with capacitor C1. The time during each half cycle of the source voltage when ASBS 20 will begin to conduct, thereby supplying gate current to triac 16 and causing the triac to switch to the conductive state, will thus be a function of the resistance in the RC circuit connected in parallel with triac 16. The triac will become current starved, and thus cease to conduct, as the source voltage approaches the zero-crossing point at the end of each half cycle. Thus, in accordance with the present invention, triac 16 functions as a rapidly operating switch which is turned on and off during each half cycle of the source voltage. The duty cycle of triac 16; i.e., that percentage of the time when the triac is permitting current to flow from the source 10 through heater 12; will be a function of the resistance in the RC circuit in parallel with the triac and this resistance, as will be described in greater detail below, is a function of the temperature being monitored by probe 18. In summary, the RC circuit and ASBS 20 cooperate to define a full wave phase control for triac 16.

In the disclosed embodiment the temperature control 18 includes a pair of posistors 22 and 24. A posistor is a passive circuit component having a resistance which varies with both temperature and voltage. A posistor is characterized by undergoing a dramatic increase in resistance at a selected temperature, called the switching temperature, and presents substantially an open circuit when subjected to temperatures above the switching temperature. Also, at temperatures above the switching temperature, the resistance of the posistor at any given temperature will vary inversely wth the impressed voltage. In one reduction to practice of the invention, the posistors employed had a "low temperature" electrical resistance of 50 ohms. At approximately 40° C., the switching temperature of the posistors, the resistance of the posistors increased sharply and the resistance reached a value of 1K ohm at approximately 70° C. In the disclosed embodiment three leads are brought out of probe 18. The probe 18; i.e., the above-mentioned three output leads; is connected to the remainder of the trigger control circuit by means of a three terminal plug 26. A two position, four terminal switch 28 is employed so that posistors 22 and 24 may be selectively connected either in series or in parallel and the selected series or parallel combination of posistors is connected in series with variable resistance R1.

As noted above, the probe, and particularly the series or parallel combination of posistors, is connected in series with the variable resistance R1. Since the resistance of the posistors is temperature sensitive, and is in series with resistance R1, the temperature at which the total resistance in series with capacitor C1 reaches the value necessary for the triac to become non-conducting may be selected over a small range of temperatures by adjusting resistance R1. Also, as the resistance of R1 increases, a larger fraction of the total voltage appears across R1 which leaves proportionately less voltage across each posistor. This also increases the resistance of the posistor due to its voltage sensitivity and causes the off-mode to occur at a still lower temperature. This increases the temperature control range beyond that normally expected based on the temperature resistance characteristics of a single posistor. While a single posistor can be employed to control temperature over a small range, the connection of these devices in series will extend the control to lower temperatures since the resistances of the posistors will add and the series connection will result in a lower voltage being impressed across each device. Similarly, connecting the posistors in parallel extends the control range to higher temperatures than would be available using a single device. Obviously, for temperature control outside the range obtainable with either a simple series or parallel combination of two posistors, either other posistors may be added to the probe or a new probe using posistors having different temperature response characteristics may be substituted for probe 18.

In one reduction to practice of the invention, with switch 28 operated to connect posistors 22 and 24 in series, temperature control to within 0.25° C. of a set point within a temperature range of 80° C. to 105° C. was obtained. With the same arrangement, temperature could also be controlled to within 1.25° C. of the set point in the temperature range of 105° C. to about 120° C. The temperature range could, however, be extended to approximately 140° C. by operating switch 28 to connect the posistors in parallel.

To summarize the operation of the present invention, that point during each half cycle of the source voltage when ASBS 20 will break down will, after initial adjustment of the variable resistor R1, be a function of the resistance contributed to the circuit by posistors 22 and 24. This resistance will, within the temperature range of interest, in turn be a function of the temperature to which the posistors are exposed. The set point; i.e., the point at which ASBS 20 will break down, will be selected by variable resistor R1. When the break down voltage of ASBS 20 is reached at the junction of capacitor C1 and resistance R1, the charge on capacitor C1 will be delivered via ASBS 20 to the gate of triac 16 causing the triac to conduct. Once turned on, the triac will conduct until the source voltage approaches the zero-crossing point at which time the triac will be starved for current and will turn off. The ASBS 20 will, of course, have been shut off by the discharge of capacitor C1. The present invention is thus a full wave asymmetrical temperature responsive control. This simple control circuit has the attributes of being compact, durable and inexpensive. More importantly, the present invention is capable of providing an inexpensive technique for the accurate control over temperature. Further, the present invention, since it is capable of handling large amounts of AC power, may be used with a wide range of processing equipment in the exercise of control over various chemical or physical processes.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A temperature responsive control comprising:
   a gate current controlled solid state switch; means for connecting said solid state switch in series with a source of alternating current and a load; and gate current control means for said solid state switch, said gate current control means including:
   voltage sensitive switch means, said switch means being normally non-conductive and having first and second terminals, a first terminal of said switch means being connected to the gate of said solid state switch; capacitor means connected between the current source and the second terminal of said switch means; and resistance means connected between the said second terminal of said switch means and the load, said resistance means comprising a variable resistor; a first and second posistor;

and switch means for selectively connecting said first and second posistors in series or in parallel and the selected series or parallel combination of posistors is connected in series with said variable resistor, said resistance means being at least in part voltage and temperature responsive whereby the rate at which said capacitor means charges will be a function of a monitored temperature and the source voltage, said switch means becoming conductive to supply gate current to said solid state switch when said capacitor means charges to a predetermined level.

2. The apparatus of claim 1 wherein said voltage sensitive switch means comprises an asymmetrical bilateral switch.

3. The apparatus of claim 1 wherein said posistors are mounted in a temperature probe.

4. The apparatus of claim 3 wherein said voltage sensitive switch means comprises an asymmetrical bilateral switch.

* * * * *